United States Patent [19]
Majid et al.

[11] Patent Number: 5,812,383
[45] Date of Patent: Sep. 22, 1998

[54] LOW POWER STAND-BY FOR SWITCHED-MODE POWER SUPPLY CIRCUIT WITH BURST MODE OPERATION

[75] Inventors: Naveed Majid, Mohegan Lake, N.Y.; Tom Mobers, Grave; Erwin G. R. Seinen, Malden, both of Netherlands

[73] Assignee: Philips Electronics North North America Corporation, New York, N.Y.

[21] Appl. No.: 903,779

[22] Filed: Jul. 31, 1997

[51] Int. Cl.$^6$ ................................ H02M 3/335
[52] U.S. Cl. ................ 363/21; 363/19; 363/49
[58] Field of Search ................ 363/18, 19, 20, 363/21, 49

[56] References Cited

U.S. PATENT DOCUMENTS

| | | | |
|---|---|---|---|
| 4,688,159 | 8/1987 | Marinus | 363/21 |
| 5,353,215 | 10/1994 | Dinwiddie et al. | 363/65 |
| 5,453,921 | 9/1995 | Shutts | 363/21 |
| 5,689,407 | 11/1997 | Marinus et al. | 363/21 |

OTHER PUBLICATIONS

"Mixed Frequency Mode Green PWM Controller", No. MC44603, Motorola Semiconductor Technical Data, pp. 1–30, Feb. 28, 1995.

*Primary Examiner*—Peter S. Wong
*Assistant Examiner*—Y. J. Han
*Attorney, Agent, or Firm*—Edward W. Goodman

[57] ABSTRACT

A switched-mode power supply circuit having an operating mode and a stand-by mode. The switched-mode power supply circuit includes a transformer and a controllable switch connected to a primary winding of the transformer for switchably connecting the primary winding to a source of d.c. voltage. In the stand-by mode, the switched-mode power supply circuit is arranged to switchable connect the primary winding to the d.c. voltage source in bursts which occur at a low frequency. Between each of the bursts, an auxiliary capacitor, which is ordinarily charged by an auxiliary winding during switching of the controllable switch, is now charged by a start-up current source contained in a controller for controlling the controllable switch.

8 Claims, 11 Drawing Sheets

LOW POWER STAND-BY FOR SWITCHED-MODE POWER SUPPLY CIRCUIT WITH BURST MODE OPERATION

BACKGROUND OF THE INVENTION

1. Field of the Invention

The subject invention relates to switched-mode power supply circuits for television receivers, in which during a stand-by mode, the switched-mode power supply circuit exhibits a burst mode operation.

2. Description of the Related Art

Figure 1:
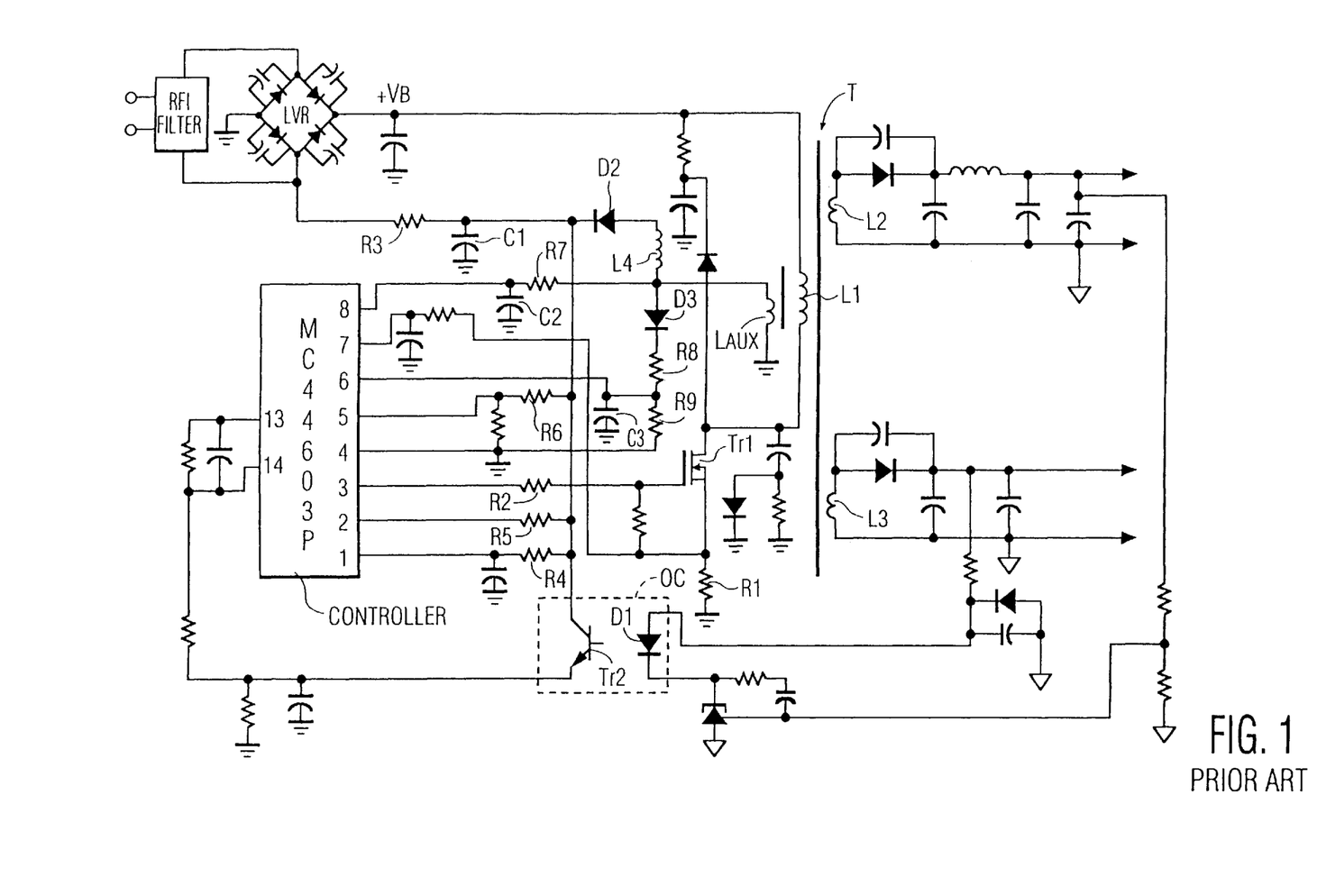
FIG. 1 shows a schematic diagram of a prior art switched-mode power supply circuit having a trickle charge circuit.

The above type of switched-mode power supply circuit is shown in FIG. 46 of the applications for a Mixed Frequency Mode Green PWM Controller No. MC44603, made by Motorola, Inc. FIG. 1 herein shows the essential portions of this switched-mode power supply circuit. In particular, the switched-mode power supply circuit includes a switching transistor Tr1 having a drain connected to the primary winding L1 of a transformer T, and an source connected through a resistor R1 to ground. The other end of winding L1 is connected to a positive terminal +$V_B$ of a line voltage rectifier LVR. The gate of transistor Tr1 is connected through a resistor R2 to the output (pin 3) of the Controller. The transformer has secondary windings L2 and L3 which are, in part, connected to a light emitting diode D1 of an opto-coupler OC. An input terminal of the line voltage rectifier LVR is connected to a filter circuit, including a series resistor R3 and a capacitor C1 connected to ground, this filter circuit then being connected, via respective resistors R4, R5 and R6, to the Vcc input (pin 1), the Vc input (pin 2) and foldback input (pin 5) of the Controller, and to a light sensing transistor Tr2 of the opto-coupler OC. The filter circuit is also connected, via a series arrangement of a diode D2 and an inductor L4, to one terminal of an auxiliary primary winding $L_{aux}$, of the transformer T, to the demagnetization detection input (pin 8) of the Controller via a filter circuit including a series resistor R7 and a capacitor C2 connected to ground, and to the over-voltage protection input (pin 6) of the Controller via the series arrangement of a diode D3 and a resistor R8, the pin 6 being shunted to ground by a capacitor C3, the resistor R8 being connected to ground (also to pin 4 of the Controller) via a resistor R9.

As soon as power is applied to the line voltage rectifier LVR, current from the filter circuit R3/C1 is applied to the auxiliary primary winding $L_{AUX}$, and is used to charge the capacitor C2 when the switching transistor Tr1 is not switching (and also to generate the positive supply voltages Vcc and Vc); this results in a constantly operating "trickle charge" circuit. The constant current drain due to this trickle charge circuit prevents the switched-mode power supply circuit from achieving truly low power operation during the stand-by mode. This is especially true in universal line voltage applications, due to the large input voltage variation ($V_{INPUT}=98V_{AC}-270V_{AC}$).

SUMMARY OF THE INVENTION

It is an object of the present invention to provide a switched-mode power supply circuit which is capable of very low power consumption during stand-by operation.

The above object is achieved with a switched-mode power supply circuit having an operating mode and a stand-by mode, said switched-mode power supply circuit comprising means for generating a d.c. supply voltage having a first output terminal and a second output terminal; a transformer having a primary winding, an auxiliary primary winding, a first secondary winding and a second secondary winding, said primary winding having a first terminal coupled to the first output terminal of said generating means and a second terminal; a controllable switch connected in a series with the second terminal of said primary winding and the second output terminal of said generating means; a main output capacitor coupled across output terminals of said first secondary winding for providing a first main output voltage in the operating state and a second main output voltage in the stand-by mode, said second main output voltage being lower than said first main output voltage; a control output capacitor coupled across output terminals of said second secondary winding for providing a control output voltage; means for selectively coupling one of the output terminals of said first secondary winding to said second secondary winding during said stand-by mode; an opto-coupler having light emitting means and light detecting means; means for selectively coupling the light emitting means of said opto-coupler across said control output capacitor during said stand-by mode; means for causing said light emitting means to emit light to said light detecting means when the control output voltage across said control output capacitor exceeds a predetermined value during said stand-by mode; and a controller having an output for supplying switching signals to said controllable switch, an auxiliary voltage sensing input coupled, via a shunting auxiliary capacitor, to said auxiliary primary winding of said transformer, and a stand-by mode detecting input coupled to an output of said light sensing means, said light sensing means having an input coupled to receive said auxiliary voltage, said controller comprising a start-up current source for charging said auxiliary capacitor during start-up of said switched-mode power supply circuit, whereby, during said stand-by mode, said start-up current source is used to intermittently charge the auxiliary capacitor.

In the above switched-mode power supply circuit, when stand-by mode is desired, the first secondary winding is connected to the second secondary winding removing energy from the main output capacitor and as such, the second main output voltage is generated across the main output capacitor. At the same time, the light emitting means of the opto-coupler is coupled across the control output capacitor. Due to the coupling of the first secondary winding to the second secondary winding, the control output voltage across the control output capacitor increases until it reaches a first predetermined value. At this point, the light emitting means activates the light detecting means of the opto-coupler causing the auxiliary voltage across the auxiliary capacitor to be applied to the stand-by mode detecting input of the controller. Upon detecting the auxiliary voltage, the controller turns off the controllable switch causing the transformer to stop transferring energy from the primary winding to the first and second secondary windings and the auxiliary winding. The control output capacitor then begins to drain causing the voltage across the control output capacitor to drop. In addition, the auxiliary capacitor begins to drain causing the voltage across the auxiliary capacitor to drop. When the control output voltage drops below the first predetermined value, the light emitting means of the opto-coupler ceases to generate light and the light detecting means turns off thereby removing the auxiliary voltage from the stand-by mode detecting input of the controller. Now, when the auxiliary voltage drops below a second predetermined value, the start-up current source in the controller is activated which applies a current to charge the auxiliary capacitor. When the auxiliary voltage rises above a third predetermined value, the controller turns off the start-up current source and causes the controllable switch to re-commence switching, and the cycle repeats.

Applicants have found that an inordinately large control output capacitor is required in order to maintain the control voltage when returning the switched-mode power supply to normal operation after burst mode stand-by operation. In order to minimize the size of the control output capacitor, it is advantageous for the start-up current source to generate a larger than normal current for charging up the auxiliary capacitor during the last cycle in the burst mode stand-by operation.

This is achieved in a method for operating a switched-mode power supply as described above, characterized in that said method comprises the steps of detecting a desired switch from burst mode stand-by operation to normal operation; causing said stand-by current source to generate a further current substantially larger than the current used for charging said auxiliary capacitor; and charging said auxiliary capacitor using said further current.

Applicants have found that when operating a switched-mode power supply circuit in a burst mode during stand-by operation, due to the very low frequency of operation, an audible rattle is generated by the transformer. This audible rattle can be minimized by reducing the allowable peak current.

To this end, a further object of the present invention is to provide a switched-mode power supply circuit which is capable of operating in a burst mode during stand-by and which generates a minimum of audible noise.

This object is achieved in a switched-mode power supply circuit as described above, characterized in that said switched-mode power supply circuit further comprises a sense resistor connected in series between said controllable switch and said second output terminal of said generating means, and said controller further comprises means for generating a measuring current; means for selectively applying said measuring current to said sense resistor during times when said controllable switch is not switching; means for measuring a voltage across said sense resistor generated by said measuring current; means for selecting a reference voltage based on said measured voltage; and means for controlling said controllable switch based on a comparison of a voltage across said sense resistor when said controllable switch is switching and said reference voltage.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 2:
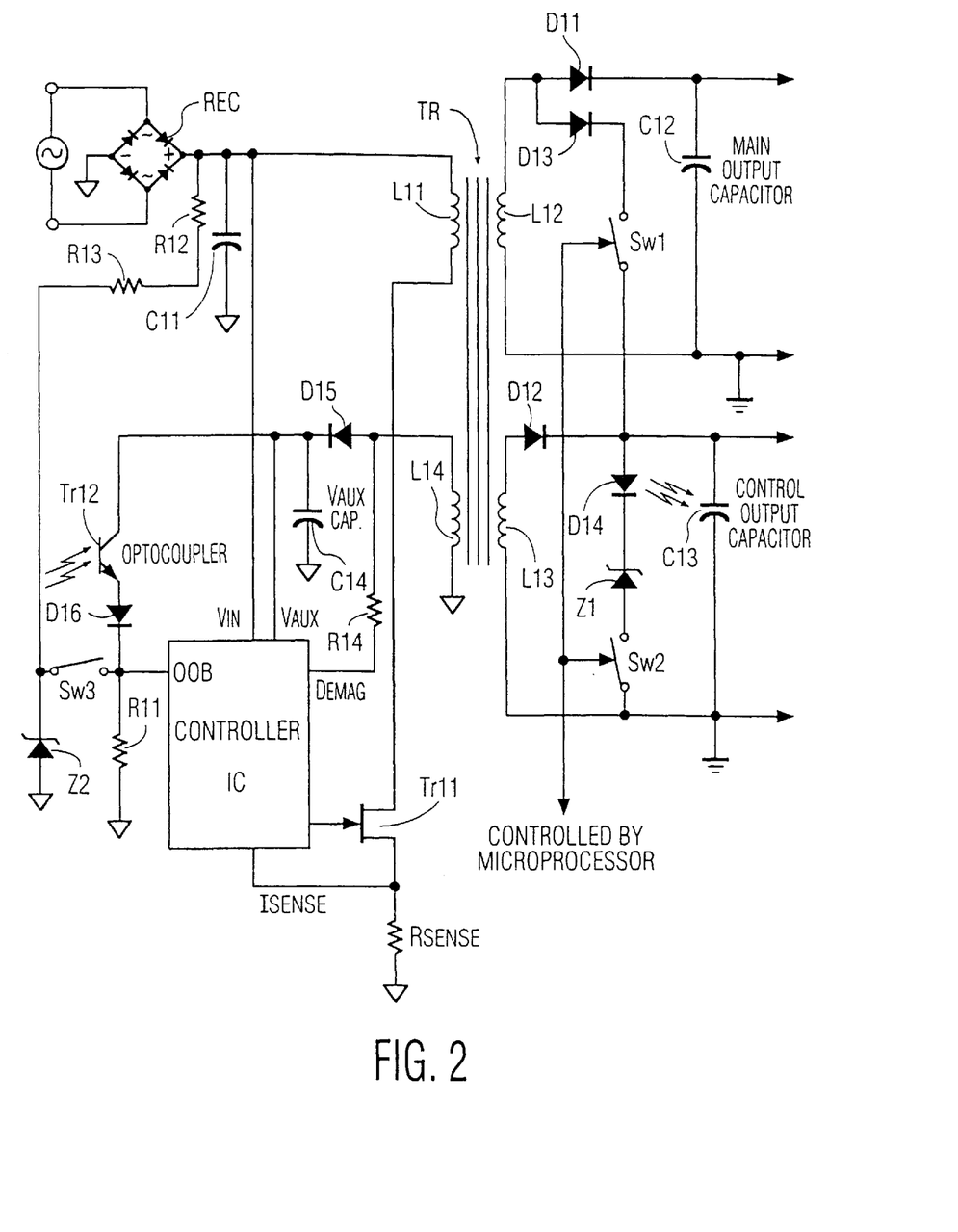
FIG. 2 shows a schematic block diagram of a first embodiment of a switched-mode power supply circuit according to the subject invention.

FIG. 2 shows a schematic block diagram of a first embodiment of the switched-mode power supply according to the subject invention using primary control. In particular, a diode rectifier bridge REC is connected to a line voltage source. An output from the rectifier bridge REC is connected to ground through a capacitor C11 and to one end of a primary winding L11 of a transformer TR. The other end of primary winding L11 is connected to one terminal of a controllable switch Tr11, the other terminal of which being connected to ground through a sense resistor $R_{SENSE}$. A first secondary winding L12 of the transformer TR has a first end and a second end connected to each other through a series arrangement of a diode D11 and a main output capacitor C12, the second end of the first secondary winding L12 also being connected to ground. A load (not shown) may be connected across the main output capacitor C12.

The transformer TR also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first secondary winding L12 is also connected via a diode D13 and a controllable switch Sw1 to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR further includes an auxiliary primary winding L14 which has one end connected to a diode D15, and then to ground through a $V_{AUX}$ capacitor C14, to a $V_{AUX}$ input of a controller IC, and to one terminal of a light sensor Tr12 of the opto-coupler, the other terminal of the light sensor Tr12 being connected to ground via resistor R11, and to a stand-by mode detecting input (OOB) of the controller IC. In addition, a series arrangement of two resistors, R12 and R13, and a Zener diode Z2 connect the output of the rectifier bridge REC to ground. The junction between resistor R13 and Zener diode Z2 is connected to the OOB input via a power switch Sw3. The other end of the auxiliary primary winding L14 is connected to ground. The controller IC also has a $V_{IN}$ input connected to the output of the rectifier bridge REC, a DEMAG input connected through a resistor R14 to the one end of the auxiliary primary winding L14, a driver output connected to the control input of controllable switch Tr11, and an $I_{SENSE}$ input connected to the resistor $R_{SENSE}$.

Figure 3:
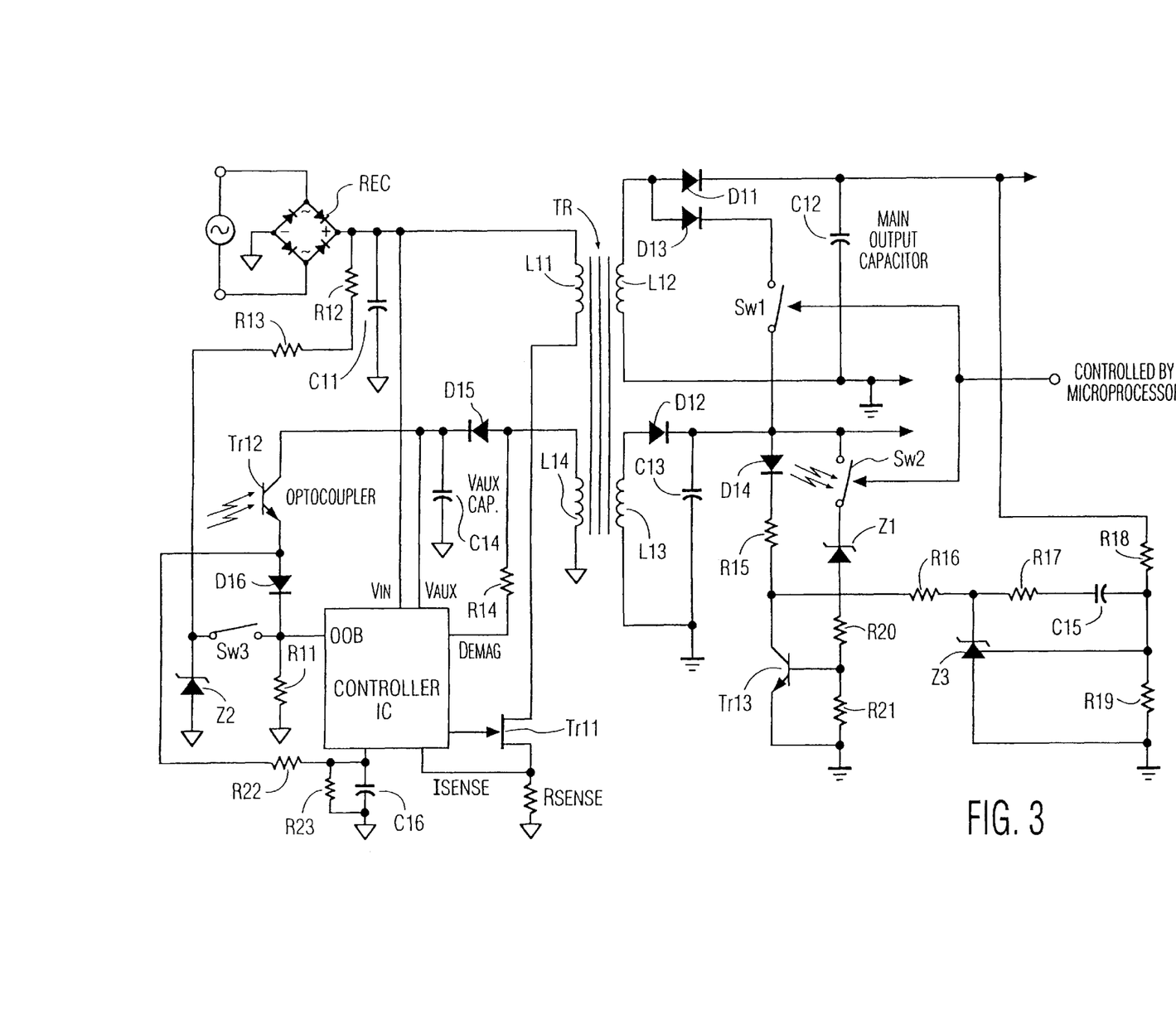
FIG. 3 shows a schematic block diagram of a second embodiment of a switched-mode power supply circuit according to the subject invention.

The embodiment shown in FIG. 2 uses a separate opto-coupler in primary sensing to signal the controller IC that burst mode stand-by is desired. However, in most switched-mode power supplies, an opto-coupler is already being used to regulate the control voltage during normal operation. FIG. 3 shows a second embodiment of the switched-mode power supply circuit of the subject invention in which the already existing opto-coupler is additionally used in secondary sensing to signal burst mode stand-by operation. In particular, the light emitting diode D14 of the opto-coupler is connected through resistors R15 and R16 to the anode of a Zener diode Z3, the cathode of which being connected to ground. A series combination of a resistor R17 and a capacitor C15 connects the anode of the Zener diode Z3 to a control terminal of the Zener diode Z3 and to junction point between resistors R18 and R19 connected between the output of the first secondary winding L12 and ground. Switch Sw2 connects the anode of Zener diode Z1 to the output of the second secondary winding L13, the cathode of Zener diode Z1 being connected to ground through the series arrangement of resistors R20 and R21. The junction between resistors R15 and R16 is connected to the collector of an NPN transistor Tr13, having an emitter connected to ground and a base connected to the junction between resistors R20 and R21. On the primary side, the junction between the light sensor Tr12 of the opto-coupler and the diode D16 is further connected through a resistor R22 to a $V_{CNTL}$ input of the controller IC which is also connected to ground through the parallel arrangement of a resistor R23 and a capacitor C16.

During normal operation, transistor Tr13 is off and the intensity of the light being emitted by the light emitting diode D14 of the opto-coupler is controlled by the circuit R16–R19, C15 and Z3. This variable light intensity causes a corresponding response in the light sensor Tr12 which applies a portion of the $V_{AUX}$ voltage to the $V_{CNTL}$ input of the controller IC for regulating the controllable switch Tr11, this voltage being less than the +5.6 volts enabling the comparator 36. However, when the microprocessor signals burst mode stand-by operation by closing switches Sw1 and Sw2, due to the increased control output voltage across the control output capacitor, transistor Tr13 turns on causing the light emitting diode D14 to emit a much increased light output, which in turn causes the light sensor Tr12 to apply the whole of the $V_{AUX}$ voltage to the OOB input of the controller IC.

Figure 4:
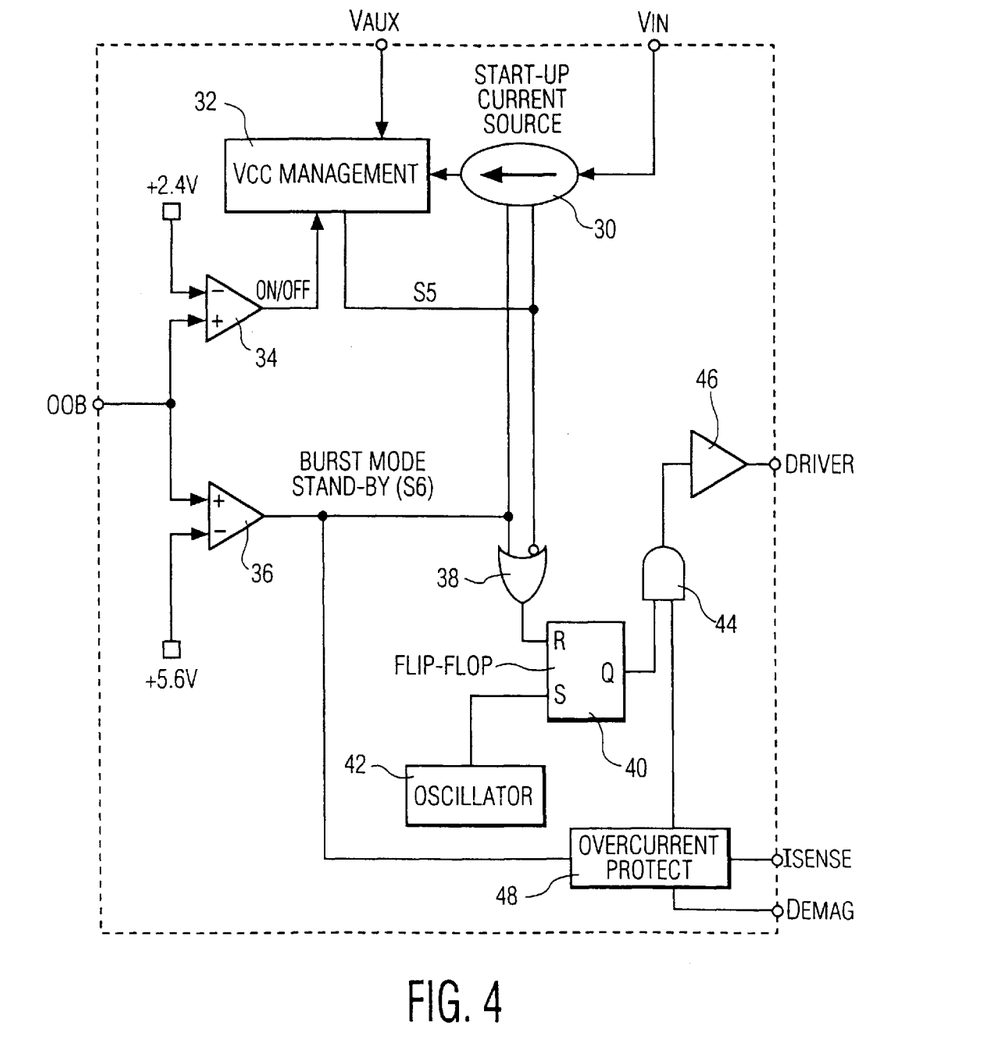
FIG. 4 shows a block diagram of the start-up current source and Vcc management circuit as well as the over-current protection circuit contained in the controller.

As shown in FIG. 4, the controller IC includes a start-up current source 30 coupled to the $V_{IN}$ input and a Vcc management circuit 32 connected to the $V_{AUX}$ input. The OOB input is connected to a first comparator 34 for comparing the voltage thereon to +2.4V, and generates an "OFF/ON" signal. This OFF/ON signal is applied to an input of the Vcc management circuit 32. The OOB input is also connected to a second comparator 36 for comparing the voltage thereon to +5.6V, for generating a "Burst Mode Stand-by" signal S6. This signal S6 is applied to the start-up current source 30 and to one input of an OR-gate 38. An output (S5) from the Vcc management circuit 32 is also applied to the start-up current source 30 and to an inverting input of OR-gate 38. An output from OR-gate 38 is applied to the reset input of an RS flip-flop 40, the set input being connected to an output of an oscillator 42. The Q output from the RS flip-flop 40 is connected to one input of an AND-gate 44 which has an output connected to a driver 46 for driving the controllable switch Tr11.

Figure 5:
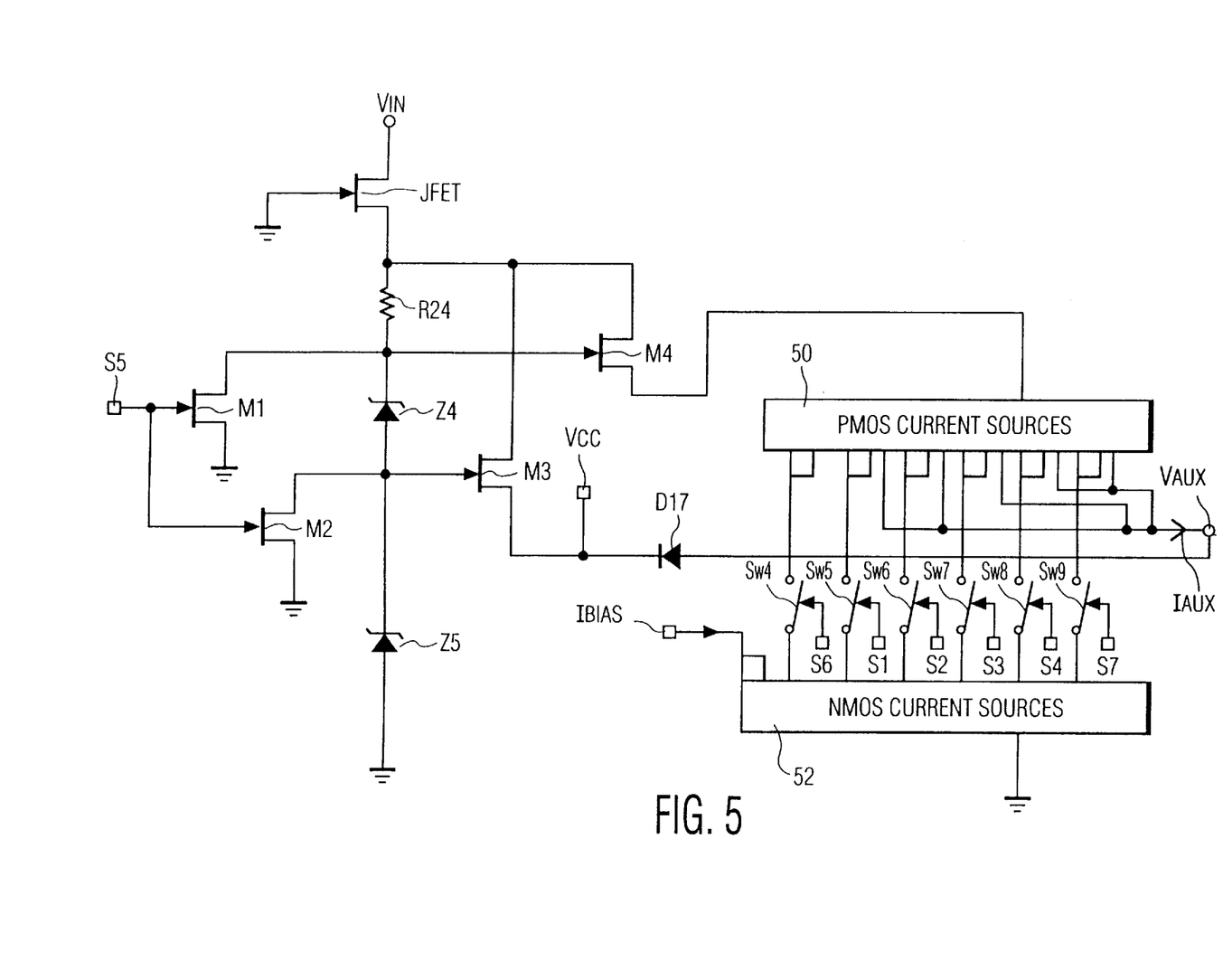
FIG. 5 shows a schematic diagram of the start-up current source.

FIG. 5 shows an embodiment of the start-up current source 30. The $V_{IN}$ is connected to a high voltage switch JFET. The gate of JFET is grounded and as such, the JFET is always on. The voltage at the source of JFET is approximately equal to the pinch-off voltage of the JFET. Resistor R24 limits the current, and Zener diodes Z4 and Z5 are used to provide gate voltages for FET switches M3 and M4. The source of FET switch M4 is connected to PMOS current sources 50 while corresponding NMOS current sources 52 are connected to ground. The NMOS current sources 52 receive a bias current $I_{BIAS}$. The $V_{AUX}$ input is connected, via diode D17 to the source of FET switch M3, which is also connected to receive the voltage Vcc. The gates of FET switches M1 and M2 are connected to receive the signal S5 and selectively connect the gates of FET switches M3 and M4, respectively, to ground.

The PMOS current sources 50 and the NMOS current sources 52 are selectively interconnected by controllable switches Sw5–Sw9 which receive the switching signals S1–S4 and S7. Depending on which of the switches Sw5–Sw9 are closed, various currents (I1–I5) are applied to the $V_{AUX}$ input. The signal S6 activates controllable switch Sw4 which suspends operation of the start-up current source 30. When not in use, the start-up current source 30 is turned off, to minimize wasteful dissipation, by the signal S5 turning on FET switches M1 and M2.

Figure 6:
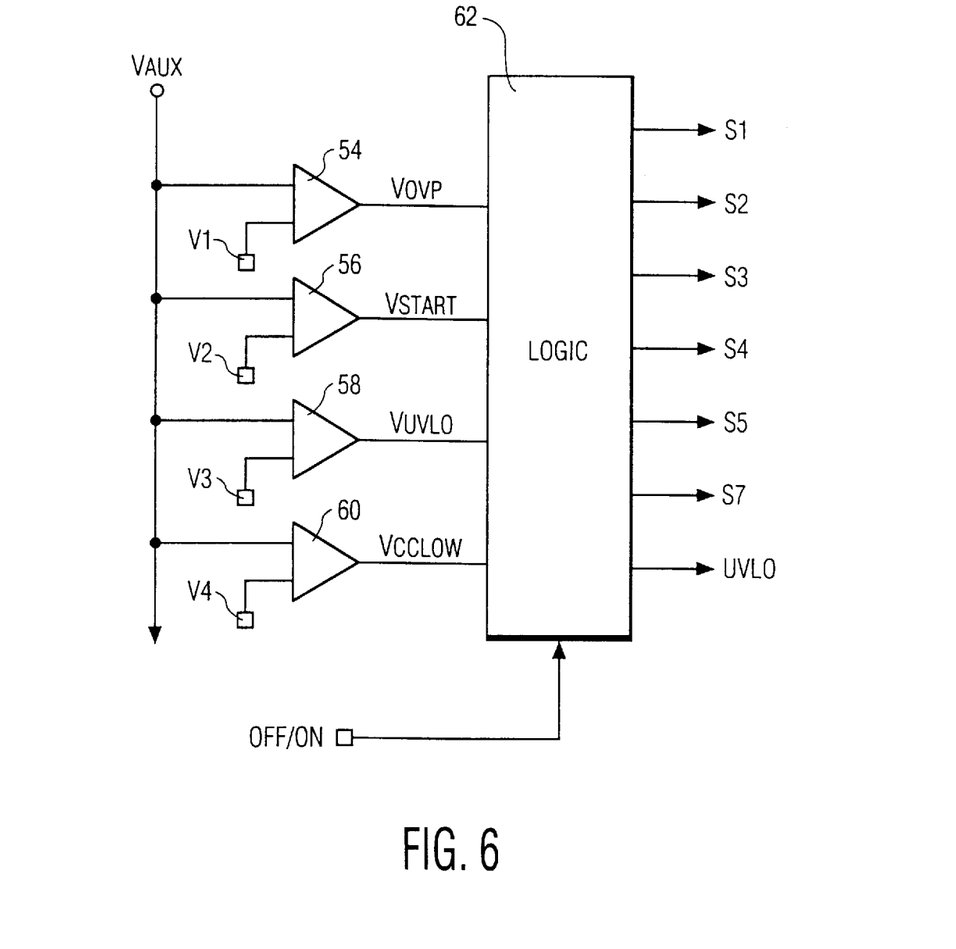
FIG. 6 shows a block diagram of the Vcc management circuit.

As shown in FIG. 6, the switching signals S1–S5 and S7 are generated by the Vcc management circuit 32. In particular, the $V_{AUX}$ input is connected to one input of comparators 54–60, which compare the $V_{AUX}$ voltage to reference voltages V1–V4 representing the over-voltage protection level (e.g., +14V), the start voltage (e.g., +11V), the under-voltage lock-out level (e.g., +8V), and the Vcc low voltage level. The outputs from the comparators 54–60 are applied to respective inputs of a logic circuit 62 which then generates the switching signals S1–S5, S7 and UVLO. The logic circuit 62 further receives the OFF/ON signal from the comparator 34.

Figure 7:
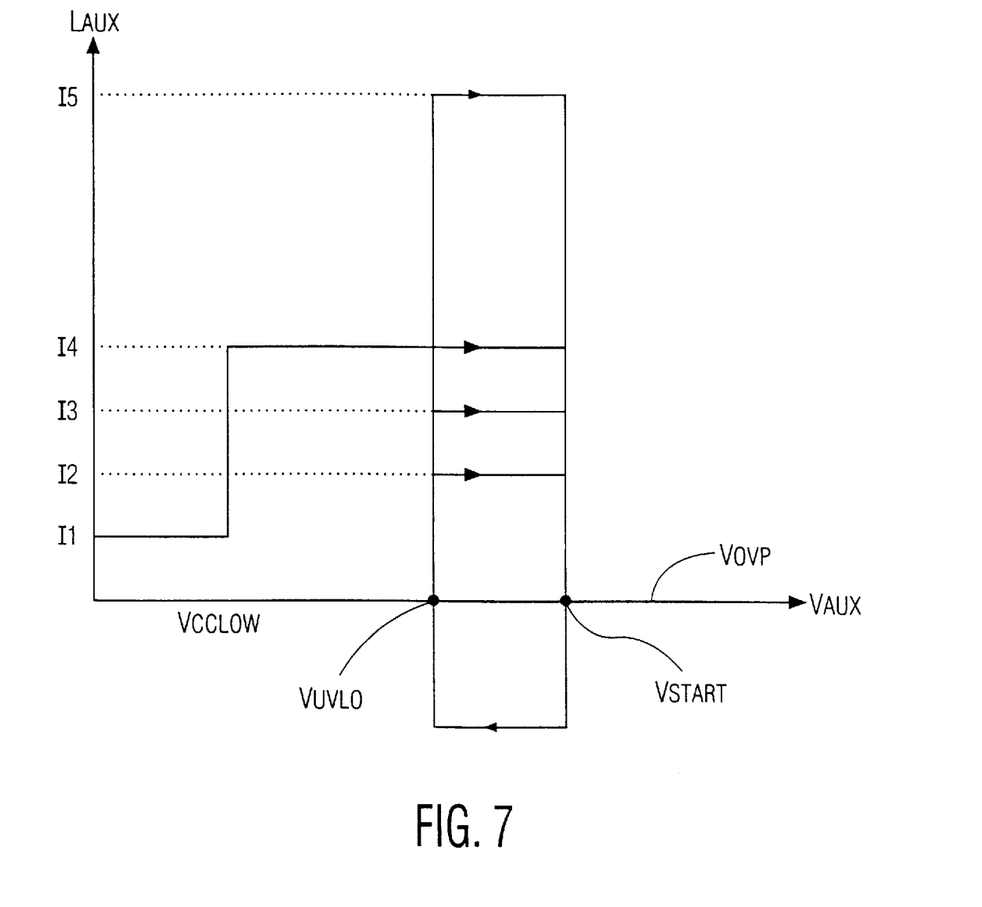
FIG. 7 is a graph showing the current $I_{AUX}$ with respect to the voltage $V_{AUX}$.

The operation of the switched-mode power supply circuit will now be described with reference to FIGS. 7 and 8. When line voltage is applied to the rectifier bridge REC, with switch Sw3 open, the controller IC is in a "sleep mode" and the current consumption is less than 300 $\mu$A. Once switch Sw3 is closed, the voltage on the OOB input is then equal to the Zener diode Z2 voltage (i.e., higher than +2.4V) causing the output from the OFF/ON comparator 34 to go "high". This commences a start-up sequence and Vcc management circuit 32 turns off the S5 signal causing the start-up current source 30 to generate current I1 which starts charging the $V_{AUX}$ capacitor C14. Once the $V_{AUX}$ voltage rises above $V_{CCLOW}$, the Vcc management circuit generates the signal S1 at t=$t_1$ at which point the start-up current source 30 generates the current I4. $V_{AUX}$ then rises faster and when $V_{AUX}$=$V_{START}$ at t=$t_2$, the Vcc management circuit 32 generates the signal S2. The controller IC (at $t_2$<t<$t_4$) now starts causing the controllable switch Tr11 to switch which then causes the transformer TR to start transferring energy from the primary winding L11 to the secondary windings L12 and L13, and also to the auxiliary primary winding L14 which then takes over supplying the $V_{AUX}$ capacitor C14. The switched-mode power supply circuit is now in normal operation and the start-up current source 30 is turned off by the S5 signal from the Vcc management circuit 32.

When burst mode stand-by operation is desired, the microprocessor closes switches Sw1 and Sw2 thereby coupling the first secondary winding L12 to the second secondary winding L13 thereby removing energy from the main output capacitor C12. In addition, switch Sw2 connects the light emitting diode D14 of the opto-coupler and the Zener diode Z1 across the second secondary winding L13. The coupling of the first and second secondary windings L12 and L13 now causes an increase in the control output voltage across the control output capacitor C13. When the control output voltage exceeds the Zener diode Z1 voltage, the light emitting diode D14 is energized. This causes the light sensor Tr12 to couple the $V_{AUX}$ voltage to the OOB input of the controller IC. Since the $V_{AUX}$ voltage is in excess of, for example, +5.6V, the comparator 36 generates the signal S6 resetting the flip-flop 40 which stops the controllable switch Tr11 from switching.

Once the controllable switch Tr11 stops switching, transformer TR ceases transferring energy form the primary winding L11 to the first and second secondary windings L12 and L13 and to the auxiliary primary winding L14. As a result, the control output capacitor C13 and the $V_{AUX}$ capacitor C14 begin to drain causing the control voltage and the $V_{AUX}$ voltage to begin to drop. When the control voltage drops below the Zener diode Z1 voltage, the light emitting diode D14 stops emitting light, the light sensor Tr12 removes the $V_{AUX}$ voltage from input OOB of the controller IC, and the comparator 36 stops generating the signal S6. The $V_{AUX}$ voltage has been dropping during this time and when the $V_{AUX}$ voltage has dropped to the $V_{UVLO}$ level, the Vcc management circuit 32 stops generating the signal S5 thereby maintaining the reset condition of the flip-flop 40, and activating the start-up current source 30 for charging up the $V_{AUX}$ capacitor C14 thereby raising the $V_{AUX}$ voltage. Once the $V_{AUX}$ voltage is at the $V_{START}$ level, the Vcc management circuit 32 generates the S5 signal which turns off the start-up current source 30 and allows the controllable switch Tr11 to commence switching. The switching of the controllable switch Tr11 allows the transformer TR to transfer energy from the primary winding L11 to the first and second secondary windings L13. This cycle then repeats itself until the microprocessor opens switches Sw1 and Sw2 indicating an end to the burst mode stand-by operation and a return to normal operation.

A disadvantage of burst mode stand-by operation is that a relatively large capacitance is required for the control output capacitor C13 during burst mode operation. The size of the control output capacitor is determined by the last two cycles during burst mode stand-by operation. In particular, during the last two cycles, the control output capacitor C13 is not recharged and its voltage continues to drop. The control output capacitor C13 must then have a large enough capacitance to ensure sufficient supply for the microprocessor connected across the control output capacitor C13 during this time.

Figure 11:
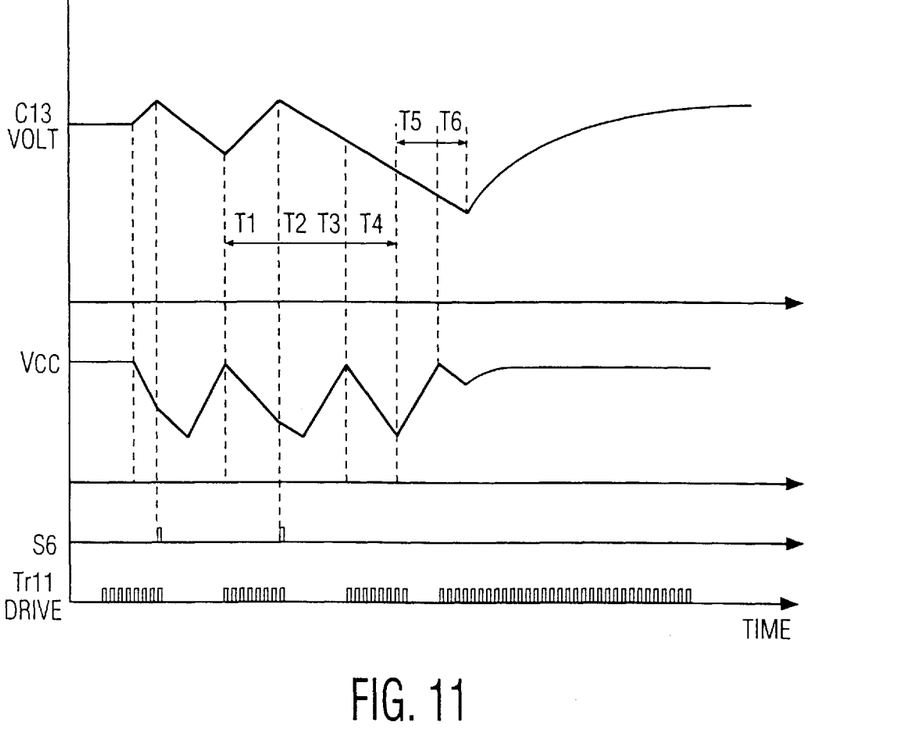
FIG. 11 is a graph showing the voltage across the control output capacitor, $V_{AUX}$, burst mode signal S6, and the drive signal.

Instead of assigning a large capacitance value to the control output capacitor C13, the start-up current source 30 is modified to supply the current I5 to the $V_{AUX}$ capacitor C14 during the time period T5 (see FIG. 11) which has the effect of significantly shortening the time period T5. It should be noted that FIG. 11 is not drawn to scale and that in fact, the time period T3 is actually much smaller than T5.

It has been found that due to the low frequency of operation during burst mode, i.e., the switching of the controllable switch Tr11 operates in bursts which occur at a low frequency, an audible rattle is generated by the transformer TR. Applicants have found that by limiting the allowable peak current through the transformer TR, this audible rattle may be minimized. To this end, as shown in FIG. 3, the controller IC includes an over-current protection circuit 48 which detects the current through the controllable switch Tr11. The over-current protection circuit 48 has inputs coupled to the $I_{SENSE}$ and DEMAG inputs of the controller IC, and receives the S6 signal from the comparator 36. An output from the over-current protection circuit 48 is coupled to a second input of the AND-gate 44.

Figure 8:
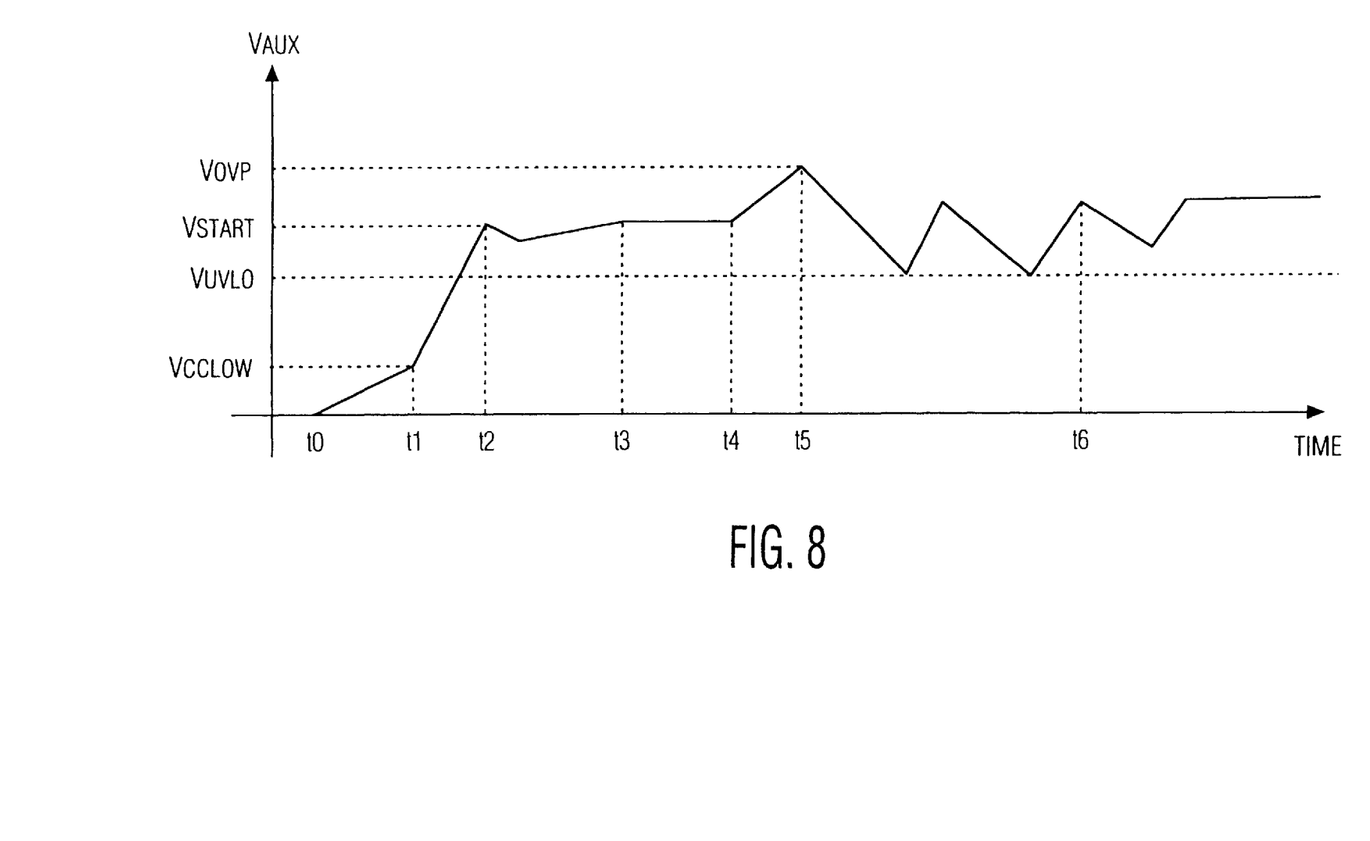
FIG. 8 is a graph showing the voltage $V_{AUX}$ with respect to time.
Figure 9:
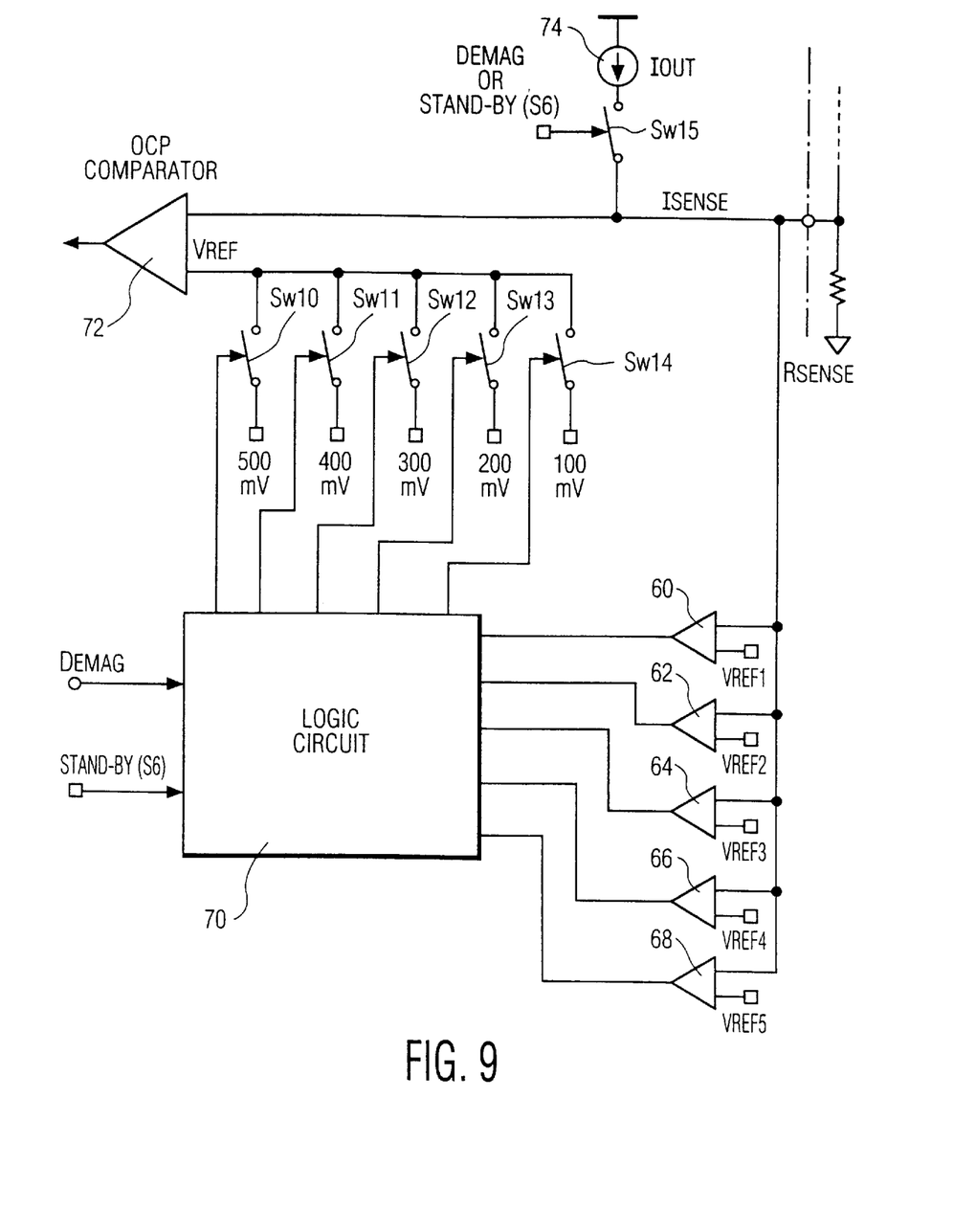
FIG. 9 is a detailed block diagram of a first embodiment of the over-current protection circuit.

An embodiment of this over-current protection circuit 48 is shown in FIG. 8. A plurality of comparators 60–68 compare the voltage on the $I_{SENSE}$ input to voltage references $V_{REF1}$–$V_{REF5}$, and apply their output signals to logic circuit 70, which receives the DEMAG signal and the S6 signal. Depending on the signals from the comparators 60–68, the logic circuit 70 closes one of the switches Sw10–Sw14 connecting a respective voltage (100 mV–500 mV) as a reference voltage to the non-inverting input of an over-current protection (OCP) comparator 72 to which the voltage on the $I_{SENSE}$ input is applied to the inverting input. An output current $I_{OUT}$ from a current source 74 is selectively applied to the $I_{SENSE}$ line by a switch Sw15 controlled by the S6 signal.

Peak current is ordinarily set by choosing the value of the resistor $R_{SENSE}$ depending on the demands of the system. However, this is a parameter which is set at the time of system design and cannot be changed depending on the state of the system (i.e., normal or burst mode stand-by operation). In order to adjust the peak current depending on system states, the over-current protection circuit 48 measures the value of $R_{SENSE}$ which, in turn, reflects the peak current selected for that particular system. Once the peak current is known, the reference trip level for the OCP comparator 72 is adjusted to bring down the peak current level below 1 ampere. This is accomplished by sending out a fixed current $I_{OUT}$ from the $I_{SENSE}$ input into the $R_{SENSE}$ resistor when the controllable switch Tr11 is not switching (during the occurrence of signal S6), and measuring the voltage:

$$V_{SENSE} = I_{OUT} * R_{SENSE}$$

$$R_{SENSE} = (500\ mV)/I_{PEAK}$$

$$V_{SENSE} = (I_{OUT} * 500\ mV)/I_{PEAK}$$

Since $I_{OUT}$ and 500 mV are constant quantities, $V_{SENSE}$ is a direct measure of $I_{PEAK}$. Depending on the value of $I_{PEAK}$, a new reference voltage is selected for the OCP comparator 72. This new reference voltage is then used during the next cycle of switching by the controllable switch Tr11.

Figure 10:
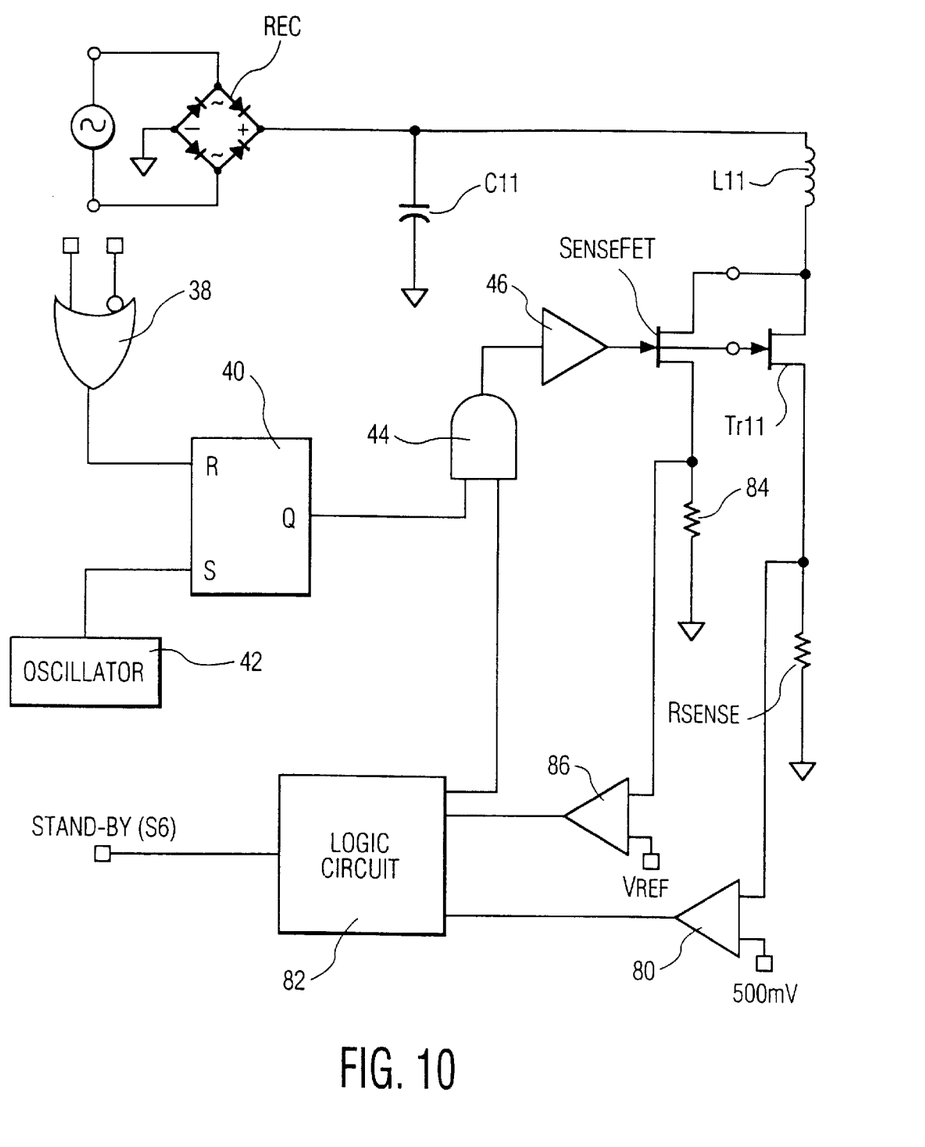
FIG. 10 is a detailed block diagram of a second embodiment of the over-current protection circuit.

An alternate embodiment of the over-current protection circuit is shown in FIG. 10. A SenseFET may be used to implement peak current reduction in an integrated power IC (PIC). A SenseFET is a smaller power transistor which is arranged in parallel with the main controllable switch Tr11. As the SenseFET is driven with the same gate drive waveform and has the same drain voltage as the controllable switch Tr11, the current through the SenseFET will be a true representation of the current through the main controllable switch Tr11. In particular, the $I_{SENSE}$ input is connected to the inverting input of an OCP comparator 80 which receives a reference voltage of 500 mV at its non-inverting input. An output from the OCP comparator 80 is applied to one input of a logic circuit 82 which receives the burst mode stand-by signal S6. The source of the SenseFET is connected to ground via a resistor 84 and to the inverting input of a comparator 86 which has its non-inverting input connected to a voltage source $V_{REF}$. An output from the comparator 86 is connected to a second input of the logic circuit 82. The resistance of resistor 84 and the value of $V_{REF}$ are set for a peak current of 1 amp.

In case of burst mode stand-by operation, under the control of the logic circuit 82, the over-current protection function is taken over by the comparator 86 instead of the OCP comparator 80, thus setting the peak current level to 1 amp. instead of at the level as determined by the $R_{SENSE}$ resistor as measured by the OCP comparator 80.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A switched-mode power supply circuit having an operating mode and a stand-by mode, said switched-mode power supply circuit comprising:

means for generating a d.c. supply voltage having a first output terminal and a second output terminal;

a transformer having a primary winding, an auxiliary primary winding, a first secondary winding and a second secondary winding, said primary winding having a first terminal coupled to the first output terminal of said generating means, and a second terminal;

a controllable switch connected in a series with the second terminal of said primary winding and the second output terminal of said generating means;

a main output capacitor coupled across output terminals of said first secondary winding for providing a first main output voltage in the operating state and a second main output voltage in the stand-by mode, said second main output voltage being lower than said first main output voltage;

a control output capacitor coupled across output terminals of said second secondary winding for providing a control output voltage;

means for selectively coupling one of the output terminals of said first secondary winding to said second secondary winding during said stand-by mode;

an opto-coupler having light emitting means and light detecting means optically coupled to said light emitting means;

means for selectively coupling the light emitting means of said opto-coupler across said control output capacitor during said stand-by mode;

means for causing said light emitting means to emit light to said light detecting means when the control output voltage across said control output capacitor exceed a predetermined value during said stand-by mode; and a controller having an output for supplying switching signals to said controllable switch, an auxiliary voltage sensing input coupled, via a shunting auxiliary capacitor, to said auxiliary primary winding of said transformer, and a stand-by mode detecting input coupled to an output of said light detecting means, said light detecting means having an input coupled to receive said auxiliary voltage, said controller comprising a start-up current source for charging said auxiliary capacitor during start-up of said switched-mode power supply, whereby, during said stand-by mode, said stand-by current source is used to intermittently charge the auxiliary capacitor when said controllable switch is not switching.

2. A method for operating a switched-mode power supply as claimed in claim 1, characterized in that said method comprises the steps:

detecting a desired switch from burst mode stand-by operation to normal operation;

causing said stand-by current source to generate a further current substantially larger than a current used for charging said auxiliary capacitor; and charging said auxiliary capacitor using said further current.

3. A switched-mode power supply circuit as claimed in claim 1, characterized in that said switched-mode power supply circuit further comprises a sense resistor connected in series between said controllable switch and said second output terminal of said generating means, and said controller further comprises:

means for generating a measuring current;

means for selectively applying said measuring current to said sense resistor during times when said controllable switch is not switching;

means for measuring a voltage across said sense resistor generated by said measuring current;

means for selecting a reference voltage based on said measured voltage; and means for controlling said controllable switch based on a comparison of a voltage across said sense resistor when said controllable switch is switching and said reference voltage.

4. A switched-mode power supply circuit as claimed in claim 1, characterized in that said controller comprises a comparator having a first input coupled to the stand-by mode detecting input of said controller, a second input coupled to receive a predetermined voltage, and an output coupled to a control input of said start-up current source and to means for stopping the supply of switching signals to said controllable switch, whereby when said voltage on said stand-by mode detecting input exceeds said predetermined voltage by said light detecting means conducting said auxiliary voltage to said stand-by mode detecting input, said comparator institutes stand-by burst mode operation by causing said stopping means to turn off said switching signals and said start-up current source to charge the auxiliary capacitor.

5. A switched-mode power supply circuit having an operating mode and a stand-by mode, said switched-mode power supply circuit comprising:

means for generating a d.c. supply voltage having a first output terminal and a second output terminal;

a transformer having a primary winding, an auxiliary primary winding, a first secondary winding and a second secondary winding, said primary winding having a first terminal coupled to the first output terminal of said generating means, and a second terminal;

a controllable switch connected in a series with the second terminal of said primary winding and the second output terminal of said generating means;

a main output capacitor coupled across output terminals of said first secondary winding for providing a first main output voltage in the operating state and a second main output voltage in the stand-by mode, said second main output voltage being lower than said first main output voltage;

a control output capacitor coupled across output terminals of said second secondary winding for providing a control output voltage;

means for regulating the control output voltage, said regulating means comprising light emitting means coupled to said control output capacitor for receiving said control output voltage, and light detecting means optically coupled to said light emitting means, said light emitting means emitting a variable light output depending on a value of said control output voltage;

means for selectively coupling one of the output terminals of said first secondary winding to said second secondary winding during said stand-by mode;

means for causing said light emitting means to emit a maximum amount of light to said light detecting means when the control output voltage across said control output capacitor exceeds a predetermined value during said stand-by mode; and a controller having an output for supplying switching signals to said controllable switch, an auxiliary voltage sensing input coupled, via a shunting auxiliary capacitor, to said auxiliary primary winding of said transformer, a control voltage input coupled to an output of said light detecting means for receiving a variable control voltage corresponding to a variable light output from said light emitting means, and a stand-by mode detecting input also coupled to the output of said light detecting means for detecting when said light detecting means is detecting a maximum light output from said light sensing means, said light detecting means having an input coupled to receive said auxiliary voltage, said controller comprising a start-up current source for charging said auxiliary capacitor during start-up of said switched-mode power supply, whereby, during said stand-by mode, said stand-by current source is used to intermittently charge the auxiliary capacitor when said controllable switch is not switching.

6. A method for operating a switched-mode power supply as claimed in claim 5, characterized in that said method comprises the steps:

detecting a desired switch from burst mode stand-by operation to normal operation;

causing said stand-by current source to generate a further current substantially larger than a current used for charging said auxiliary capacitor; and charging said auxiliary capacitor using said further current.

7. A switched-mode power supply circuit as claimed in claim 5, characterized in that said switched-mode power supply circuit further comprises a sense resistor connected in series between said controllable switch and said second output terminal of said generating means, and said controller further comprises:

means for generating a measuring current;

means for selectively applying said measuring current to said sense resistor during times when said controllable switch is not switching;

means for measuring a voltage across said sense resistor generated by said measuring current;

means for selecting a reference voltage based on said measured voltage; and means for controlling said controllable switch based on a comparison of a voltage across said sense resistor when said controllable switch is switching and said reference voltage.

8. A switched-mode power supply circuit as claimed in claim 2, characterized in that said controller comprises a comparator having a first input coupled to the stand-by mode detecting input of said controller, a second input coupled to receive a predetermined voltage, and an output coupled to a control input of said start-up current source and to means for stopping the supply of switching signals to said controllable switch, whereby when said voltage on said stand-by mode detecting input exceeds said predetermined voltage by said light detecting means conducting said auxiliary voltage to said stand-by mode detecting input, said comparator institutes stand-by burst mode operation by causing said stopping means to turn off said switching signals and said start-up current source to charge the auxiliary capacitor.

* * * * *